(12) United States Patent
Sato et al.

(10) Patent No.: US 7,981,541 B2
(45) Date of Patent: Jul. 19, 2011

(54) NONAQUEOUS ELECTROLYTE SECONDARY BATTERY

(75) Inventors: Yuuichi Sato, Tokyo (JP); Kengou Kurata, Kumagaya (JP); Hirotaka Hayashida, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 702 days.

(21) Appl. No.: 12/027,827

(22) Filed: Feb. 7, 2008

(65) Prior Publication Data

US 2008/0131769 A1    Jun. 5, 2008

Related U.S. Application Data

(63) Continuation of application No. 11/242,010, filed on Oct. 4, 2005, now abandoned, which is a continuation of application No. PCT/JP2004/004846, filed on Apr. 2, 2004.

(30) Foreign Application Priority Data

Apr. 4, 2003 (JP) ................................ 2003-102021

(51) Int. Cl.
*H01M 2/02* (2006.01)
*H01M 2/00* (2006.01)
*H01M 2/08* (2006.01)

(52) U.S. Cl. ........ 429/174; 429/163; 429/164; 429/178; 429/185

(58) Field of Classification Search .................. 429/174, 429/163, 164, 178, 185
See application file for complete search history.

(56) References Cited

U.S. PATENT DOCUMENTS

| | | | |
|---|---|---|---|
| 5,993,990 A | 11/1999 | Kanto et al. | |
| 6,617,069 B1 * | 9/2003 | Hopper et al. | 429/61 |

FOREIGN PATENT DOCUMENTS

| | | |
|---|---|---|
| JP | 10-144278 | 5/1998 |
| JP | 11-317218 | 11/1999 |
| JP | 11-339758 | 12/1999 |
| JP | 2001-196043 | 7/2001 |
| JP | 3083873 | 11/2001 |
| JP | 2002-110254 | 4/2002 |
| JP | 2002-525806 | 8/2002 |

OTHER PUBLICATIONS

Jess Stein, The Random House College Dictionary, 1980, Random House, Inc., Revised Edition, Section N and Section D.

* cited by examiner

*Primary Examiner* — Helen O Conley
(74) *Attorney, Agent, or Firm* — Oblon, Spivak, McClelland, Maier & Neustadt, L.L.P.

(57) ABSTRACT

The invention provides a nonaqueous electrolyte secondary battery excellent in output characteristic such as large current discharge or pulse discharge in ordinary use, high in safety by preventing destruction due to suppression of current in an abnormality such as external short-circuiting, and further large in capacity. The nonaqueous electrolyte secondary battery comprises an external can opened at one end thereof, an electrode assembly contained in the external can, and comprising a negative electrode, a separator and a positive electrode, a nonaqueous electrolyte contained in the external can, and a sealing lid group tightly sealed at the opening of the external can by way of an insulating member, wherein the sealing lid group includes an intact plate-like PTC element having a fragile portion to be easily broken due to elevation of internal pressure by gas generation.

12 Claims, 12 Drawing Sheets

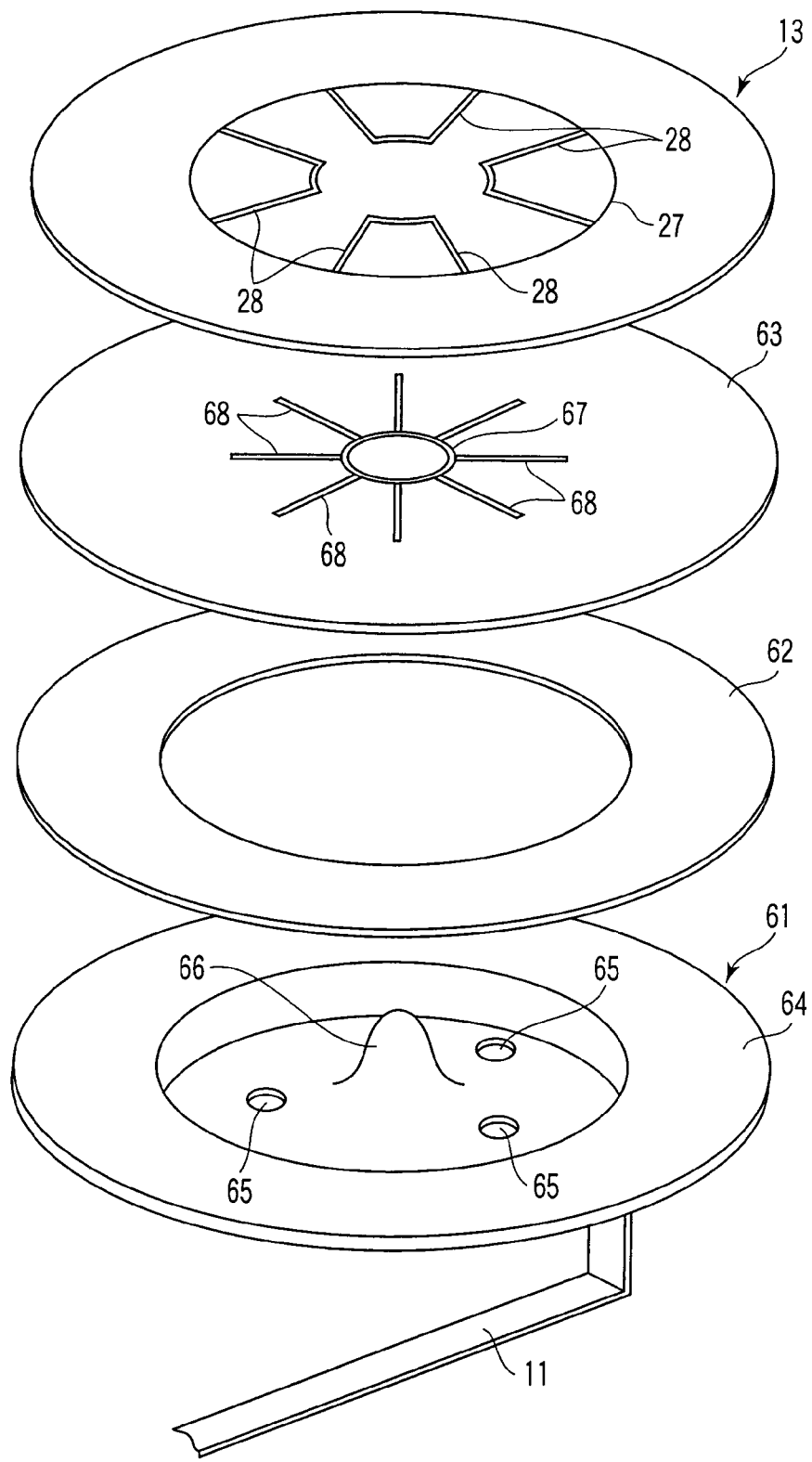
F I G. 12

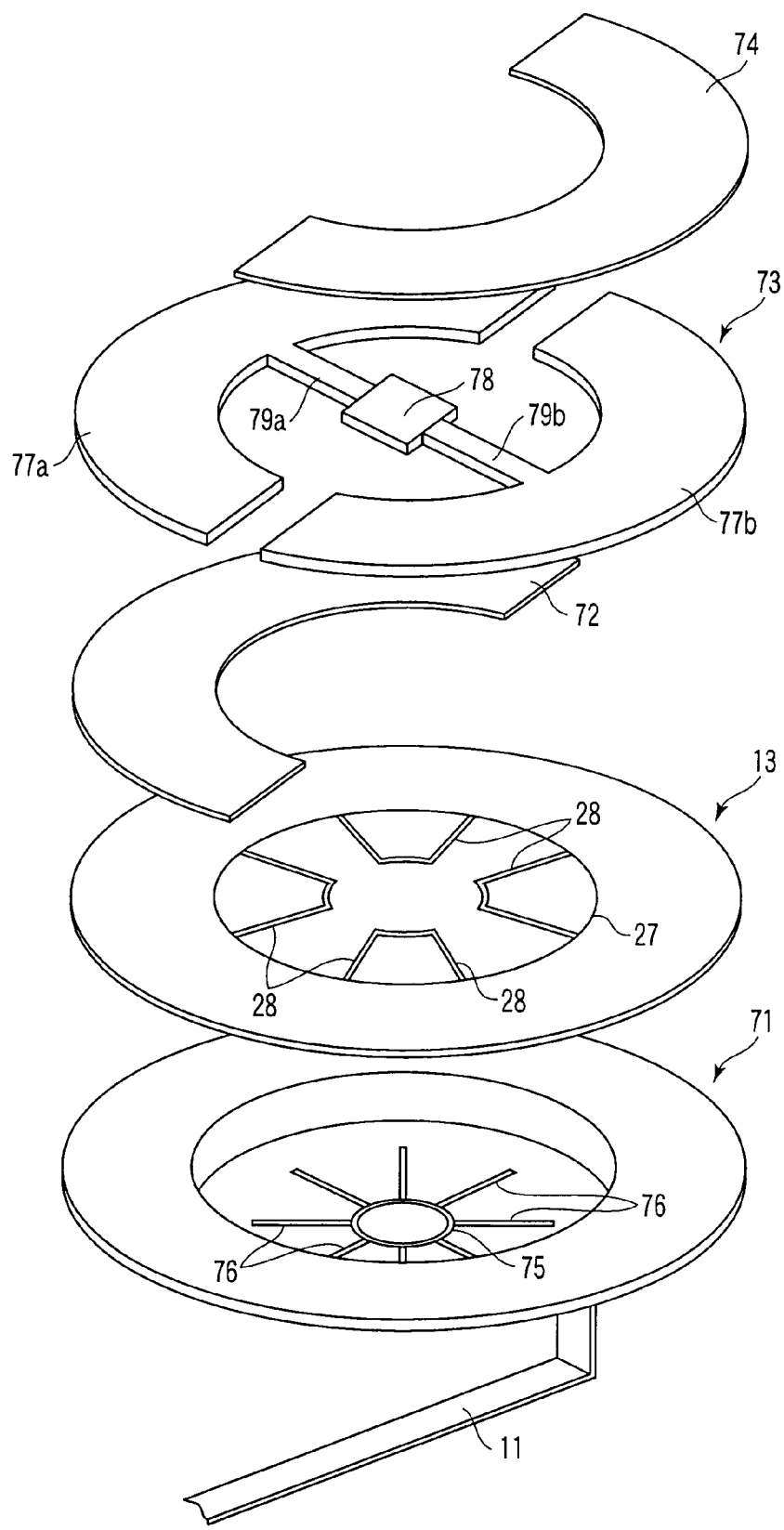
F I G. 14

NONAQUEOUS ELECTROLYTE SECONDARY BATTERY

CROSS-REFERENCE TO RELATED APPLICATIONS

This is a Continuation Application of Ser. No. 11/242,010 filed Oct. 4, 2005, which is a Continuation Application of PCT Application No. PCT/JP2004/004846, filed Apr. 2, 2004, which was published under PCT Article 21(2) in Japanese.

This application is based upon and claims the benefit of priority from prior Japanese Patent Application No. 2003-102021, filed Apr. 4, 2003, the entire contents of which are incorporated herein by reference.

BACKGROUND OF THE INVENTION

1. Field of the Invention

The present invention relates to a nonaqueous electrolyte secondary battery.

2. Description of the Related Art

Recently, along with a downsizing trend of electronic appliances such as cellular phones and portable personal computers and an increase in demand for them, there is a mounting demand for higher performance in secondary batteries used as a power source of these electronic appliances. To meet such a demand, nonaqueous electrolyte batteries using a material, such as a carbon material, capable of intercalating and deintercalating lithium ions as a negative electrode material have been developed, and are used widely as a power source for portable electronic appliances. The nonaqueous electrolyte secondary battery is, unlike the conventional battery, characterized by light weight and high electromotive force, and its excellent performance has been noticed. In particular, the portable personal computer has varied functions, including Web browsing, electronic mail exchange, and video viewing. Accordingly, the battery used as a power source is required to have not only larger capacity, but also higher output, that is, excellent large current discharge characteristic and pulse discharge characteristic.

For higher output of a secondary battery, it is needed to decrease the output resistance (internal resistance) of the battery. It is hence extremely important to lower the resistance of electrodes and battery constituent members.

For this purpose, various secondary batteries have been proposed, including a cylindrical lithium ion secondary battery or square lithium ion secondary battery having plural current collecting leads attached to electrodes thereof, as disclosed in Jpn. Pat. Appln. KOKAI Publication Nos. 11-317218 and 11-339758. Such secondary batteries are improved in current collection efficiency and lowered in output resistance, so that enhancement of the output characteristic is achieved.

Jpn. Pat. Appln. KOKAI Publication No. 2002-110254 discloses enhancement of the output characteristic of a lithium ion secondary battery by reducing the thickness of the electrodes. In these electrodes, in particular, by reducing the thickness of the positive electrode, diffusion of lithium ions in the electrodes is accelerated, and a lithium ion secondary battery of high output can be obtained.

However, when plural current collecting leads are connected to the electrodes as disclosed in Jpn. Pat. Appln. KOKAI Publication Nos. 11-317218 and 11-339758, the assembly procedure is complicated, and consequently, productivity of batteries is lowered.

In addition, when the battery is designed by reducing the thickness of the electrodes as in Jpn. Pat. Appln. KOKAI Publication No. 2002-110254, the occupying rate of current collectors in electrodes is larger, and the quantity of reaction substances such as active materials of electrodes is inevitably decreased. This is significantly disadvantageous in terms of advance of larger capacity of the secondary battery. Therefore, to achieve both larger capacity and higher output of the secondary battery, it is further required to lower the resistance of battery constituent members without reducing the thickness of electrodes more than necessary.

On the other hand, the lithium ion secondary battery has other problems, that is, overcurrent flows in the battery in the event of an abnormality such as overcharge or short-circuiting, a nonaqueous electrolysis solution is decomposed, and a decomposition reaction of the electrolysis solution causes heat generation to raise the battery temperature, or liquid leaks or causes a rupture. As a countermeasure, the lithium ion secondary battery incorporates, as one of battery constituent members, a ring-shaped PTC element for limiting the flow of current due to elevation of resistance when the battery temperature rises by overcharge or the like. The PTC element has a structure in which an element main body showing a sharp resistance increase along with temperature elevation caused by overcurrent or the like is disposed between a pair of electrodes.

By forming the PTC element in a ring shape, a sufficient gas passage can be provided. That is, a rupture plate which is broken by elevation of internal pressure due to gas generation is separately assembled in an external can to the inner side from the PTC element so as to be connected to the PTC element. The rupture plate breaks to release gas when the battery internal pressure is raised due to heat generation or another abnormality. At this time, by forming the PTC element in a ring shape, a gas passage is maintained in the hollow space, so that gas can be smoothly discharged and released outside.

In the PTC element, however, since its material configuration and shape, especially shape aspects, function as relatively large resistance components, elevation of output of the secondary battery may be hindered.

BRIEF SUMMARY OF THE INVENTION

It is hence an object of the invention to provide a nonaqueous electrolyte secondary battery excellent in output characteristic such as large current discharge or pulse discharge in ordinary use, and effective in current suppression at an abnormal time such as external short-circuiting.

According to the present invention, there is provided a nonaqueous electrolyte secondary battery comprising:

an external can opened at one end thereof;

an electrode assembly contained in the external can, and comprising a negative electrode, a separator and a positive electrode;

a nonaqueous electrolyte contained in the external can; and a sealing lid group tightly sealed at the opening of the external can by way of an insulating member, wherein the sealing lid group comprises an intact plate-like PTC element having a fragile portion to be easily broken due to elevation of internal pressure by gas generation.

BRIEF DESCRIPTION OF THE SEVERAL VIEWS OF THE DRAWING

FIG. 12 is an exploded perspective view showing essential parts of a sealing lid group assembled in the cylindrical nonaqueous electrolyte secondary battery in FIG. 11.

FIG. 14 is an exploded perspective view showing essential parts of a sealing lid group assembled in the cylindrical nonaqueous electrolyte secondary battery in FIG. 13.

DETAILED DESCRIPTION OF THE INVENTION

The present invention will be specifically described below.

First Embodiment

Figure 1:
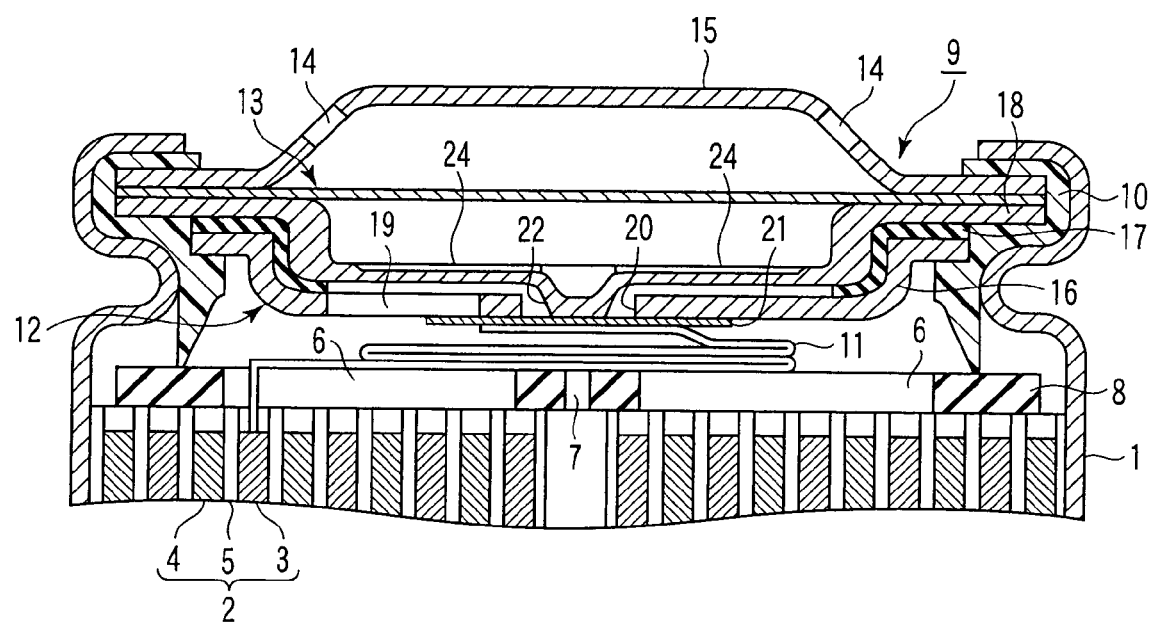
FIG. 1 is a partial sectional view showing a cylindrical nonaqueous electrolyte secondary battery according to a first embodiment of the invention.
Figure 2:
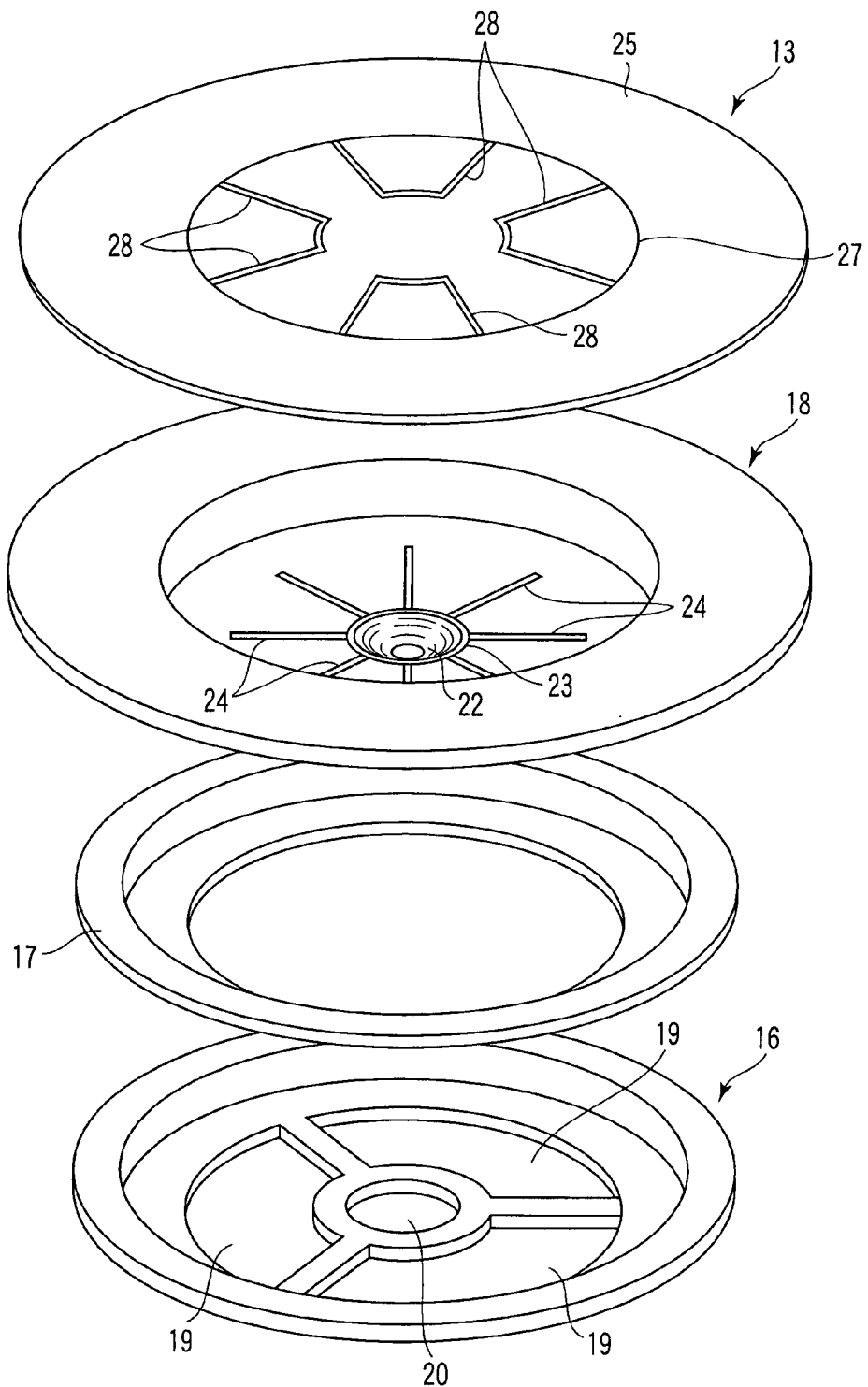
FIG. 2 is an exploded perspective view showing essential parts of a sealing lid group assembled in the cylindrical nonaqueous electrolyte secondary battery in FIG. 1.
Figure 3:
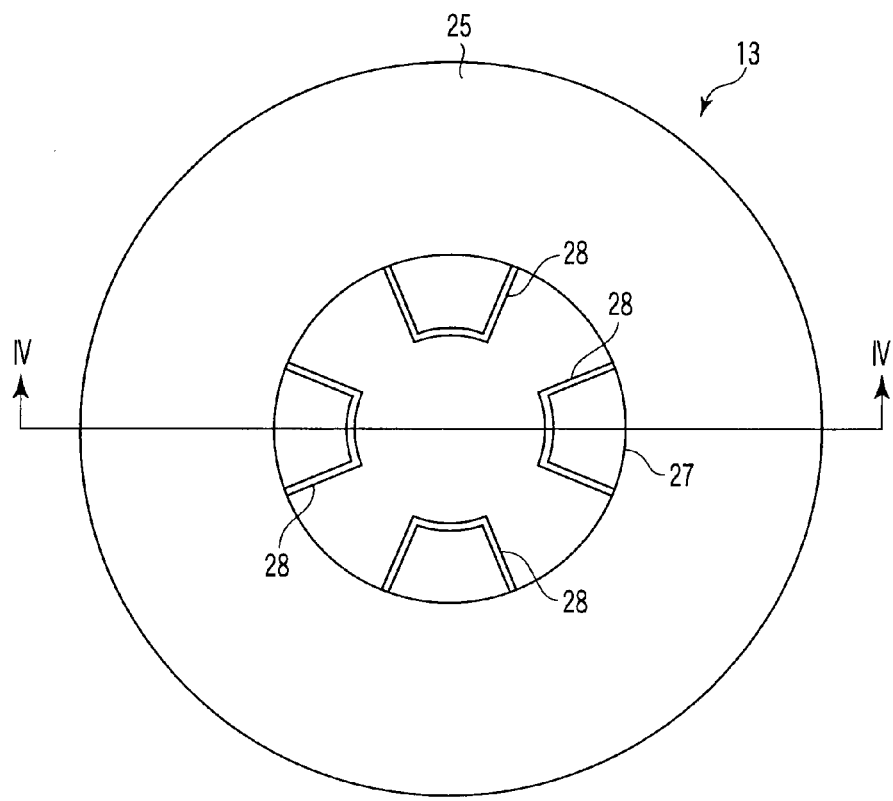
FIG. 3 is a plan view showing a PTC element assembled in the cylindrical nonaqueous electrolyte secondary battery in FIG. 1.
Figure 4:
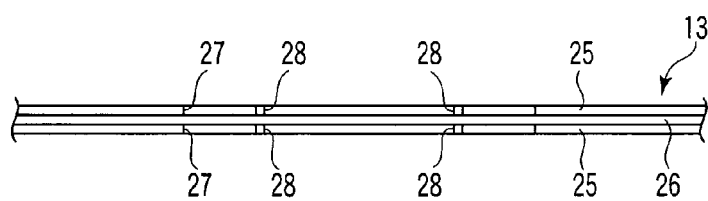
FIG. 4 is a sectional view taken along line IV-IV in FIG. 3.

FIG. 1 is a partial sectional view showing a cylindrical nonaqueous electrolyte secondary battery according to a first embodiment of the invention; FIG. 2 is an exploded perspective view showing essential parts of a sealing lid group assembled in the cylindrical nonaqueous electrolyte secondary battery in FIG. 1; FIG. 3 is a plan view showing a PTC element assembled in the cylindrical nonaqueous electrolyte secondary battery in FIG. 1; and FIG. 4 is a sectional view taken along line IV-IV in FIG. 3.

As shown in FIG. 1, an external can 1 of cylindrical shape with a bottom is made of, for example, stainless steel or iron, and also functions as one polar terminal (for example, negative electrode terminal). In the bottom of the external can 1, an insulator (not shown) is disposed. An electrode assembly 2 is contained in the external can 1. The electrode assembly 2 is constituted of a positive electrode 3, a negative electrode 4, and a separator 5 interposed therebetween to wind up spirally. An insulated presser plate 8 having two semicircular holes 6 and a small hole 7 near the center is disposed on the electrode assembly 2 in the external can 1.

A sealing lid group 9 is insulated and closed in the upper end opening of the external can 1 by way of, for example, an insulating gasket 10. The sealing lid group 9 is electrically connected to one electrode (for example, positive electrode 3) of the electrode assembly 2 by way of, for example, a folding type lead wire 11 made of a metal such as aluminum. The sealing lid group 9 has a current breaking member 12 for conducting and cutting off current, the current breaking member having a open valve which is cut off when internal pressure elevates due to gas generation, a PTC element 13, and a hat-shaped terminal plate 15 having gas vents 14 opened and serving as the other polar terminal (for example, positive electrode terminal), which are disposed sequentially in this order from the electrode assembly 2 side by crimping and fixing the peripheral edges by the insulating gasket 10.

The current breaking member 12 is not particularly limited in structure or composition. Specifically, as shown in FIGS. 1 and 2, the current breaking member 12 comprises a metallic stripper 16, and a metallic rupture plate 18 overlaid on the stripper 16 by way of an insulating sheet 17. The stripper 16, insulating sheet 17, and rupture plate 18 are formed like a dish, and the peripheral edges are crimped and fixed by the insulating gasket 10. The insulating sheet 17 is opened at the central side from near the riser part, and forms a gas passage.

The stripper 16, as shown in FIG. 2, has three sector holes 19 as gas passages at a position thereof corresponding to the opening of the insulating sheet 17, and also has a small hole 20 near the center thereof. A conductive thin film 21 is bonded to the side of the stripper 16 opposite to the electrode assembly 2 so as to seal the small hole 20. At the side of the conductive thin film 21 opposite to the electrode assembly 2, the lead 11 is connected. The stripper 16 is made of stainless steel or aluminum, and is formed in a thickness of 0.1 to 1.0 mm. The conductive thin film 21 is made of, for example, aluminum, and is formed in a thickness of 0.05 to 0.2 mm. The conductive thin film may be omitted.

The rupture plate 18 has a protrusion 22 projecting toward the stripper 16 in the central part so as to operate also as current breaking means as shown in FIG. 2, and the leading end of the protrusion 22 is connected to the conductive thin film 21 through the opening of the insulating sheet 17 and the small hole 20 of the stripper 16. In order that the rupture plate 18 also functions as an open valve, notches, for example, a circular notch 23 surrounding the protrusion 22 and eight linear notches 24 formed to extend radially to the peripheral edges from the circular notch 23, are formed at the side of the PTC element 13. The rupture plate 18 is made of, for example, stainless steel or aluminum, and is formed in a thickness of 0.1 to 0.5 mm.

The terminal plate 15 serving as the other polar terminal (for example, positive electrode terminal) having the gas vent 14 opened is made of, for example, stainless steel or aluminum, and is formed in a thickness of 0.2 to 1.0 mm.

The PTC element 13 is interposed between the rupture plate 18 of the current breaking member 12 and the terminal plate 15, that is, in a current passage of the positive electrode, and limits current by increase of resistance when the temperature rises due to flow of overcurrent, and prevents abnormal heat generation caused by a large current. The PTC element 13 is in a disk shape as shown in FIGS. 1 and 2, and is crimped and fixed to the insulating gasket 10 so as to cover the entire rupture plate 18.

The PTC element 13 has a structure as shown in FIG. 4, for example, in which a resin sheet 26 of polyethylene or polypropylene containing conductive carbon is interposed between a pair of electrodes 25 composed of a metal thin film such as a nickel thin film.

The PTC element 13 has a notch, which is a fragile portion to be easily broken by elevation of internal pressure due to gas generation, formed at least at the side of the terminal plate 15. For example, as shown in FIGS. 2 to 4, four sector notches 28 (blade type notches) including the circular notch 27 are formed symmetrically on the pair of electrodes 25 on both sides of the resin sheet 26. These notches formed in the PTC element 13 are broken when the gas generated in the battery reaches a predetermined pressure, and act to open a gas passage in the disk-shaped PTC element 13.

Notches to be formed in the PTC element 13 are preferably formed in a closed loop shape (for example, circular shape) at least near the center as shown in FIGS. 2 to 4 described above. However, the notches are not limited to the closed loop shape, but may be formed, for example, in a cross shape having two linear notches intersected, or in a C shape obtained by partly cutting off the loop. The intersecting linear notches may be three or more.

Aside from the shape in FIGS. 2 to 4 described above, notches having a closed loop shape at least near the center (for example, circular shape, quadrangular shape, triangular shape, or another polygonal shape) will be explained below with reference to FIGS. 5A to 5D. The notches may be formed at the side of the PTC element 13 opposite to the terminal plate 15 or at both sides.

Figure 5A:
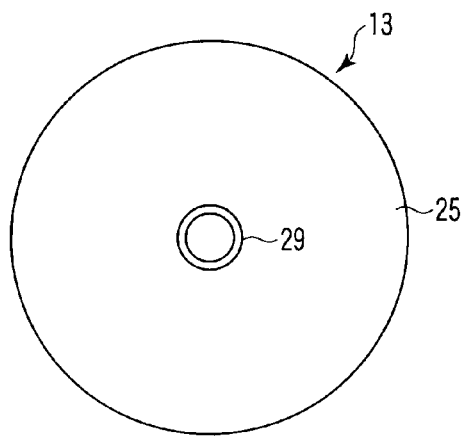
FIG. 5A is a plan view showing another mode of the PTC element assembled in the nonaqueous electrolyte secondary battery of the invention.

(1) The PTC element 13 shown in FIG. 5A has a small circular notch 29 formed in the electrode 25.

Figure 5B:
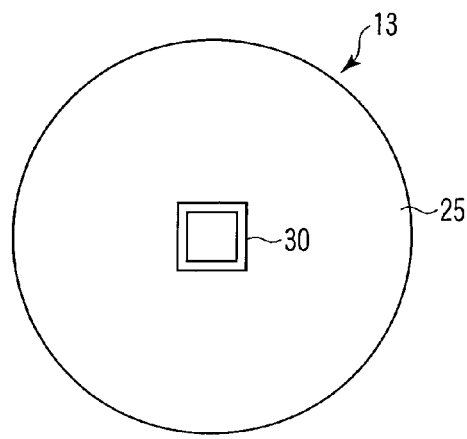
FIG. 5B is a plan view showing another mode of the PTC element assembled in the nonaqueous electrolyte secondary battery of the invention.

(2) The PTC element 13 shown in FIG. 5B has a small square notch 30 formed in the electrode 25.

Figure 5C:
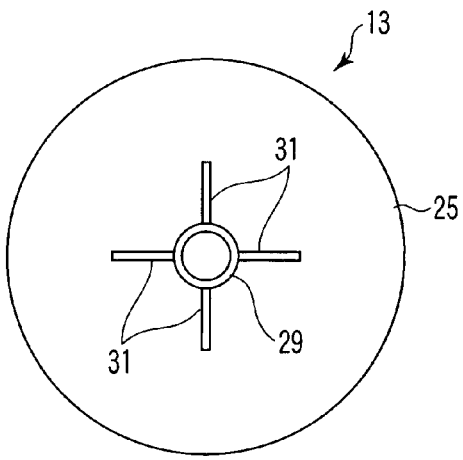
FIG. 5C is a plan view showing another mode of the PTC element assembled in the nonaqueous electrolyte secondary battery of the invention.

(3) In the electrode 25 of the PTC element 13 shown in FIG. 5C, a small circular notch 29 and, for example, four linear notches 31 extending radially from the notch 29 to the peripheral edge of the electrode 25 are formed. The number of linear notches 31 is not limited to four, but may be two, three, five or more.

Figure 5D:
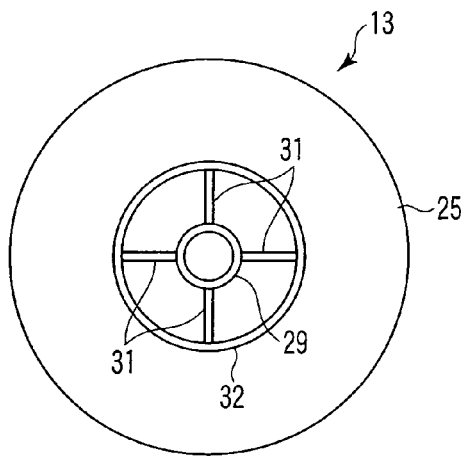
FIG. 5D is a plan view showing another mode of the PTC element assembled in the nonaqueous electrolyte secondary battery of the invention.

(4) In the electrode 25 of the PTC element 13 shown in FIG. 5D, small circular and large circular notches 29, 32 are concentrically formed, and also, for example, four linear notches 31 crossing with these small circular and large circular notches 29, 32, and extending radially are formed. The number of linear notches 30 is not limited to four, but may be two, three, five or more. The circular notches may be also formed in three or four circles concentrically.

In the notches formed in a closed loop shape at least near the center, the notch in the shape of FIG. 5C has an intersection of notches as compared with FIGS. 5A and 5B. Thus, when the gas generated in the battery reaches a predetermined pressure, the PTC element can be easily broken. The notch in the shape of FIG. 5D has more intersections than that in FIG. 5C, and therefore, the PTC element can be broken more easily when the gas generated in the battery reaches a predetermined pressure. Further, the notches in the shape of FIGS. 2 to 4 described above can break the PTC element yet more easily when the gas generated in the battery reaches a predetermined pressure because of layout of notches as compared with FIG. 5D, or the like.

The depth of the notch formed in the PTC element is preferably 4% or more of the electrode thickness (t1), and not more than the total thickness (t1+t2×0.2) of the electrode thickness (t1) and 20% of the resin sheet thickness (t2). If the depth is less than 4% of the electrode thickness, the PTC element may be hardly broken with the notch being a starting point when the gas generated in the battery tears the rupture plate and reaches the PTC element. On the other hand, if the depth of the notch exceeds the total thickness of the electrode thickness and 20% of the resin sheet thickness, the function of the PTC element may be broken.

The width of the notch formed in the PTC element is not particularly specified, but is preferably 5 µm or more. More preferably, the width of the notch is 50 µm or more. If the width of the notch is less than 5 µm, the PTC element may hardly be broken with the notch being a starting point when the gas generated in the battery tears the rupture plate and reaches the PTC element. The upper limit of the width of the notch is preferably 5 mm.

The opening area of the notch formed in the PTC element is 1 mm$^2$ or more, more preferably 5 mm$^2$ or more. If the opening area of the notch is less than 1 mm$^2$, the PTC element may hardly be broken with the notch being a starting point when the gas generated in the battery tears the rupture plate and reaches the PTC element. The upper limit of the opening area of the notch is preferably 120 mm$^2$.

Figure 6:
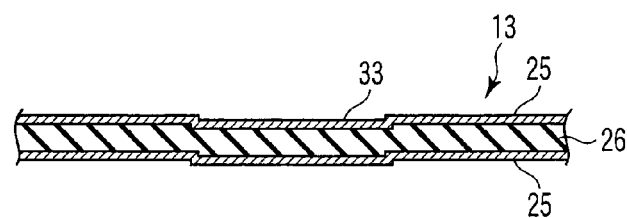
FIG. 6 is a sectional view showing another mode of the PTC element assembled in the nonaqueous electrolyte secondary battery of the invention.

The fragile portion to be easily broken by elevation of internal pressure due to gas generation formed in the PTC element may be, for example, a circular recess 33 as shown in FIG. 6. The recess is not limited to circular, but may be polygonal such as quadrangular or pentagonal.

The depth (step) of the recess is preferably 20 µm or more.

The electrode assembly, the positive electrode, negative electrode and separator configuring the electrode assembly, and the nonaqueous electrolyte will be specifically explained below.

1) Electrode Assembly

The electrode assembly is composed by interposing a separator between a positive electrode and a negative electrode. Specifically, the electrode assembly is manufactured by (i) winding the positive electrode and negative electrode flatly or spirally together with the separator interposed therebetween; (ii) winding the positive electrode and negative electrode spirally together with the separator interposed therebetween, and then compressing in a radial direction; (iii) folding the positive electrode and negative electrode one or more together with the separator interposed therebetween; or (iv) laminating the positive electrode and negative electrode together with the separator interposed therebetween.

The electrode assembly may not be pressed, but may be pressed to reinforce the integrating strength of the positive electrode, negative electrode and separator. It may be also heated at the time of pressing.

2) Positive Electrode

The positive electrode has a structure in which a positive electrode layer containing an active material is carried on one side or both sides of a current collector.

The positive electrode layer comprises a positive electrode active material, a binder, and a conductive agent.

Preferable examples of the positive electrode active material include various oxides, for example, manganese dioxide, lithium-manganese composite oxide, lithium-containing nickel oxide, lithium-containing cobalt oxide (for example, $LiCoO_2$), lithium-containing nickel cobalt oxide (for example, $LiNi_{0.8}Co_{0.2}O_2$), and lithium-manganese composite oxide (for example, $LiMn_2O_4$, $LiMnO_2$) because a high voltage can be obtained from these materials.

Examples of the conductive agent include acetylene black, carbon black, and graphite.

Examples of the binder include polytetrafluoroethylene, polyvinylidene fluoride, ethylene-propylene-diene copolymer, and styrene-butadiene rubber.

The blending rate of the positive electrode active material, conductive agent, and binder is preferably in a range of 80 to 95 wt. % of the positive electrode active material, 3 to 20 wt. % of the conductive agent, and 2 to 7 wt. % of the binder.

As the current collector, a porous conductive board or intact conductive board may be used. The conductive board is manufactured from, for example, aluminum or stainless steel.

The positive electrode is fabricated, for example, by suspending the positive electrode active material, conductive agent, and binder in a proper solvent, applying the suspension on the current collector, drying, and pressing one to five times at a desired pressure.

The filling density of positive electrode after pressing is desired to be between 2.8 and 4.0 g/cm$^3$.

The current collector is preferably made of aluminum. The aluminum made positive electrode current collector is stable at a positive electrode potential, and excellent in electrical conductivity, and hence can contribute to enhancement of rate characteristic and cycle performance of the battery.

Further, a positive electrode tab is desirably welded to an exposed region of the current collector of the positive electrode.

3) Negative Electrode

The negative electrode comprises a negative electrode current collector, and a negative electrode layer containing a negative electrode material and a binder, the negative electrode layer being carried on one side or both sides of the negative electrode current collector.

The negative electrode material is preferably a carbonaceous matter for intercalating and deintercalating lithium ions. Examples of the carbonaceous matter include a graphitic material or carbonaceous material such as graphite, coke, carbon fiber and spherical carbon, thermosetting resin, isotropic pitch, mesophase pitch, and a graphitic material or carbonaceous material obtained by heating mesophase pitch carbon fiber or mesophase spherule at 500 to 3000° C.

A preferable example of the carbonaceous matters is the graphitic material containing graphite crystals, which is obtained by heat treatment at 2000° C. or higher temperature, and whose plane interval d002 is between 0.336 and 0.34 nm.

Examples of the binder include polytetrafluoroethylene, polyvinylidene fluoride, ethylene-propylene-diene copolymer, styrene-butadiene rubber, and carboxy methyl cellulose.

The blending rate of the negative electrode active material, conductive agent, and binder is preferably in a range of 80 to 98 wt. % of the negative electrode active material, 3 to 30 wt. % of the conductive agent, and 1 to 7 wt. % of the binder.

As the current collector, a porous conductive board or intact conductive board may be used. The conductive board is manufactured from, for example, copper, stainless steel, or nickel. The thickness of the current collector is desirably 5 to 20 μm. This is because balance of electrode strength and weight reduction is assured in this range.

The negative electrode is fabricated, for example, by suspending the negative electrode active material, conductive agent, and binder in a proper solvent, applying the suspension on the current collector, drying, and pressing once to five times at a desired pressure. The application quantity of the negative electrode is preferably between 50 and 140 g/m$^2$ on one side of the current collector.

The filling density of the negative electrode after pressing is desired to be between 1.3 and 1.8 g/cm$^3$ in the central area of the electrode in the lateral direction.

As the negative electrode material, aside from the above carbonaceous matter for intercalating and deintercalating lithium ions, other materials may be also used such as metal for intercalating and deintercalating lithium ions, metal oxide, metal sulfide, metal nitride, lithium metal, and lithium alloy.

Examples of the metal oxide include tin oxide, silicon oxide, lithium titanium oxide, niobium oxide, and tungsten oxide.

Examples of the metal sulfide include tin sulfide, and titanium sulfide.

Examples of the metal nitride include lithium cobalt nitride, lithium iron nitride, and lithium manganese nitride.

Examples of the lithium alloy include lithium aluminum alloy, lithium tin alloy, lithium lead alloy, and lithium silicon alloy.

When other material capable of intercalating and deintercalating lithium than the graphitic material or carbonaceous material is used as the negative electrode active material, it is desired to use, for example, acetylene black, carbon black, graphite or the like as the conductive agent.

4) Separator

The separator is desirably formed of a porous sheet.

As the porous sheet, for example, a porous film or nonwoven cloth may be used. The porous sheet is preferred to be made of at least one material selected from, for example, polyolefin and cellulose. The polyolefin includes, for example, polyethylene and polypropylene. The porous film made of polyethylene, or polypropylene, or both is preferred because the safety of the secondary battery is enhanced.

The thickness of the separator is desired to be 30 μm or less. A more preferred range is 5 to 30 μm, and a further preferred range is 8 to 25 μm.

The separator is preferred to be 20% or less in heat shrinkage after heating for 1 hour at 120° C. More preferably, heat shrinkage is 15% or less.

Porosity of the separator is preferred to be in a range of 30 to 70%. A more preferred range of the porosity is 35 to 70%.

Air permeability of the separator is preferred to be 700 sec/100 cm$^3$ or less. The air permeability refers to time (seconds) required for 100 cm$^3$ of air to pass through a porous sheet. A more preferred range is 30 to 500 sec/100 cm$^3$, and a further preferred range is 50 to 150 sec/100 cm$^3$.

An end of the separator along the lateral direction is desired to project 0.25 to 2 mm from an end of the negative electrode along the lateral direction.

5) Nonaqueous Electrolyte

The nonaqueous electrolyte may be used in a form of liquid, gel or solid (high molecular solid electrolyte).

The liquid nonaqueous electrolyte (nonaqueous electrolytic solution) is obtained, for example, by dissolving an electrolyte (for example, lithium salt) in a nonaqueous solvent. The gel nonaqueous electrolyte contains a nonaqueous electrolytic solution and a high molecular material to which the nonaqueous electrolytic solution is held. Examples of the high molecular material include polyvinylidene fluoride, polyacrylonitrile, polyethylene oxide, polyvinyl chloride, polyacrylate, and polyvinylidene fluoride hexafluoropropylene.

The nonaqueous solvent is not particularly limited, and any known nonaqueous solvent as a solvent for a nonaqueous electrolyte secondary battery can be used. It is preferred to use a nonaqueous solvent consisting mainly of a mixed solvent of ethylene carbonate, and one or more nonaqueous solvents (hereinafter called second solvents) lower in melting point than the ethylene carbonate and having 18 or less donors. Such a nonaqueous solvent is stable in the presence of substances for composing the negative electrode, low in risk of reduction decomposition or oxidation decomposition of the electrolyte, and high in conductivity. Examples of the second solvent include dimethyl carbonate, methyl ethyl carbonate, diethyl carbonate, ethyl propionate, methyl propionate, propylene carbonate, γ-butyrolactone, acetonitrile, ethyl acetate, toluene, xylene, and methyl acetate. Above all, chain carbonate is preferred. The second solvent may be used either alone or in a mixture of two or more types.

Viscosity of the mixed solvent is preferred to be 28 mp or less at 25° C. The content of ethylene carbonate in the mixed solvent is preferred to be 10 to 80% by volume. If out of this range, the conductivity may be lowered or the solvent may be decomposed, so that the charge and discharge efficiency may be lowered. A more preferred content of the ethylene carbonate is 20 to 75% by volume. By increasing the content of ethylene carbonate in the nonaqueous solvent to 20% by volume, the ethylene carbonate can be easily dissolved in lithium ions, and therefore, decomposition suppressing effect of the solvent can be enhanced.

A more preferred composition of the mixed solvent is a mixed solvent of EC and MEC; EC, PC and MEC; EC, MEC and DMC; and EC, MEC, PC and DEC, and the ratio of MEC is preferred to be 30 to 80% by volume. Thus, by adjusting the ratio of MEC to 30 to 80% by volume, or more preferably 40 to 70% by volume, the conductivity can be enhanced. On the other hand, from the view point of suppressing reduction decomposition reaction of the solvent, when an electrolytic solution having carbon dioxide dissolved therein is used, it is effective for enhancing the capacity and cycle life.

Major impurities existing in the mixed solvent are, for example, water and organic peroxides (for example, glycols, alcohols, carboxylic acids). These impurities may cause to lower the cycle life or capacity. They may also increase the self-discharge when stored at high temperature (60° C. or more). Accordingly, in the nonaqueous electrolyte containing the nonaqueous solvent, such purities are preferably reduced as much as possible. Specifically, the water content is preferred to be 50 ppm or less, and the organic peroxides is preferred to be 1000 ppm or less.

Examples of the electrolyte include lithium salts such as lithium perchlorate, lithium phosphate hexafluoride ($LiPF_6$), lithium borate tetrafluoride ($LiBF_4$), lithium arsenate hexafluoride ($LiAsF_6$), lithium trifluoromethasulfonate ($LiCF_3SO_3$), and lithium bistrifluoromethyl sulfonylimide $[LiN(CF_3SO_2)_2]$. Among them, $LiPF_6$, $LiBF_4$, and $LiN(CF_3SO_2)_2$ are particularly preferred.

The dissolving amount of the electrolyte in the nonaqueous solvent is preferred to be in a range of 0.5 to 2 mol/L.

In the nonaqueous electrolyte secondary battery according to the first embodiment shown in FIGS. 1 to 4, the operation will be explained in various modes, that is, (1) normal mode, (2) abnormal mode (external short-circuiting), and (3) abnormal mode (overcharging).

(1) Normal Mode

In the normal charge and discharge mode, the PTC element 13 placed, for example, in the current path of the positive electrode is an intact plate (for example, disk shape). As compared with the conventional ring-shaped PTC element, the area of the PTC element 13 is wider and the resistance is lower, that is, the internal resistance of the battery can be lowered. Consequently, higher output, that is, an excellent large current discharge characteristic and pulse discharge characteristic can be obtained.

(2) External Short-Circuiting Mode

When a large current flows due to external short-circuiting, the PTC element 13 positioned between the current breaking member 12 and the terminal plate 15 is actuated by heat generation due to own resistance, and the resistance increases suddenly. Accordingly, by suppressing the current flow, heat generation and elevation of the internal pressure due to a continuous large current can be avoided.

(3) Overcharging Mode

When, due to overcharging, the temperature in the external can 1 elevates, gas is generated due to reaction between the electrode assembly 2 and the nonaqueous electrolyte and due to decomposition of the nonaqueous electrolyte, and the internal pressure climbs up, the gas passes through the holes 6, 7 in the insulating presser plate 8, the three sector holes 19 opened in the stripper 16 of the current breaking member 12, and the opening in the insulating sheet 17 to reach the rupture plate 18, and pushes up the rupture plate 18 to the terminal plate 15 side. When the rupture plate 18 is pushed up, the stripper 16 and the conductive thin film 21 are not deformed. Therefore, the protrusion 22 of the rupture plate 18 is departed from the conductive thin film 21, and the conduction path of the positive electrode is electrically cut off. As a result, further heat generation and elevation of the internal pressure due to continuous current can be avoided.

If the internal pressure further climbs up after cutting off the current transmission path of the positive electrode, a higher gas pressure is applied to the rupture plate 18 of the current breaking member 12 through the gas passage. At this time, since the notches 23, 24 are formed in the rupture plate 18 as shown in FIG. 2, the rupture plate 18 is broken from the notches 23, 24 due to the applied pressure of gas. As the rupture plate 18 is broken, the gas further flows into the circular PTC element 13. Then, since the PTC element 13 has the notches 27, 28 as shown in FIGS. 2 to 4, the PTC element 13 is broken with these notches 27, 28 as a starting point, and thus, the gas is smoothly released outside through the gas vent 14 of the terminal plate 15 from the broken position of the PTC element 13. As a result, destruction of the battery due to excessive elevation of the internal pressure can be prevented.

In the event of impact such as heavy drop, in addition to the rupture plate 18, the PTC element 13 is provided which has a rupture function and has the notches 27, 28 formed therein. Thus, even if one rupture function member (for example, rupture plate 18) is broken, the PTC element 13 having the rupture function maintains a normal state without being broken. Consequently, even if water invades from outside through the gas vent 14 of the terminal plate 15, it can be cut off by the normal PTC element 13, and invasion of water into the nonaqueous electrolyte (for example, nonaqueous electrolytic solution) in the external can 1 can be blocked. In addition, discharge of the nonaqueous electrolytic solution in the external can 1 can be blocked by the normal PTC element 13, and leak of the nonaqueous electrolytic solution can be prevented.

As a result, deterioration of the electrolytic solution due to invasion of water can be prevented, and excellent battery performance can be maintained. In addition, when the secondary battery is assembled as, for example, a battery pack, prevention of leakage of the nonaqueous electrolytic solution makes it possible to avoid various problems such as short-circuiting of a protective circuit by the nonaqueous electrolytic solution, smoking, and firing.

Therefore, according to the first embodiment, the resistance of the PTC element which is a constituent member of the battery is lowered in the normal state, so that discharge of high output is realized. On the other hand, in the event of abnormality such as external short-circuiting or overcharging, heat generation (temperature rise) and elevation of the internal pressure can be prevented. Further, even if gas generation or elevation of the internal pressure is caused by temperature rise, the PTC element itself is broken, the gas passage is formed to release gas promptly, and breakage or the like can be prevented from occurring. Moreover, double rupture function members of the rupture plate and intact PTC element are provided, whereby in the event of impact such as a fall, invasion of water from outside or leakage of the nonaqueous electrolytic solution can be prevented. As a result, it is possible to provide a nonaqueous electrolyte secondary battery having a high output characteristic, high safety, and high reliability.

According to the nonaqueous electrolyte secondary battery of the invention, since a high output can be obtained without reducing the thickness of the electrode assembly, the electrode reaction volume can be increased, and the battery capacity can be increased.

Further, since a bundling structure of lead wires can be avoided, not only the productivity is increased, but also the effective area in the battery can be increased and the battery capacity is further increased.

In the cylindrical nonaqueous electrolyte secondary battery of the first embodiment shown in FIGS. 1 and 2, the sealing plate group may also have a conductive support plate shown in FIGS. 7 to 10.

Figure 7:
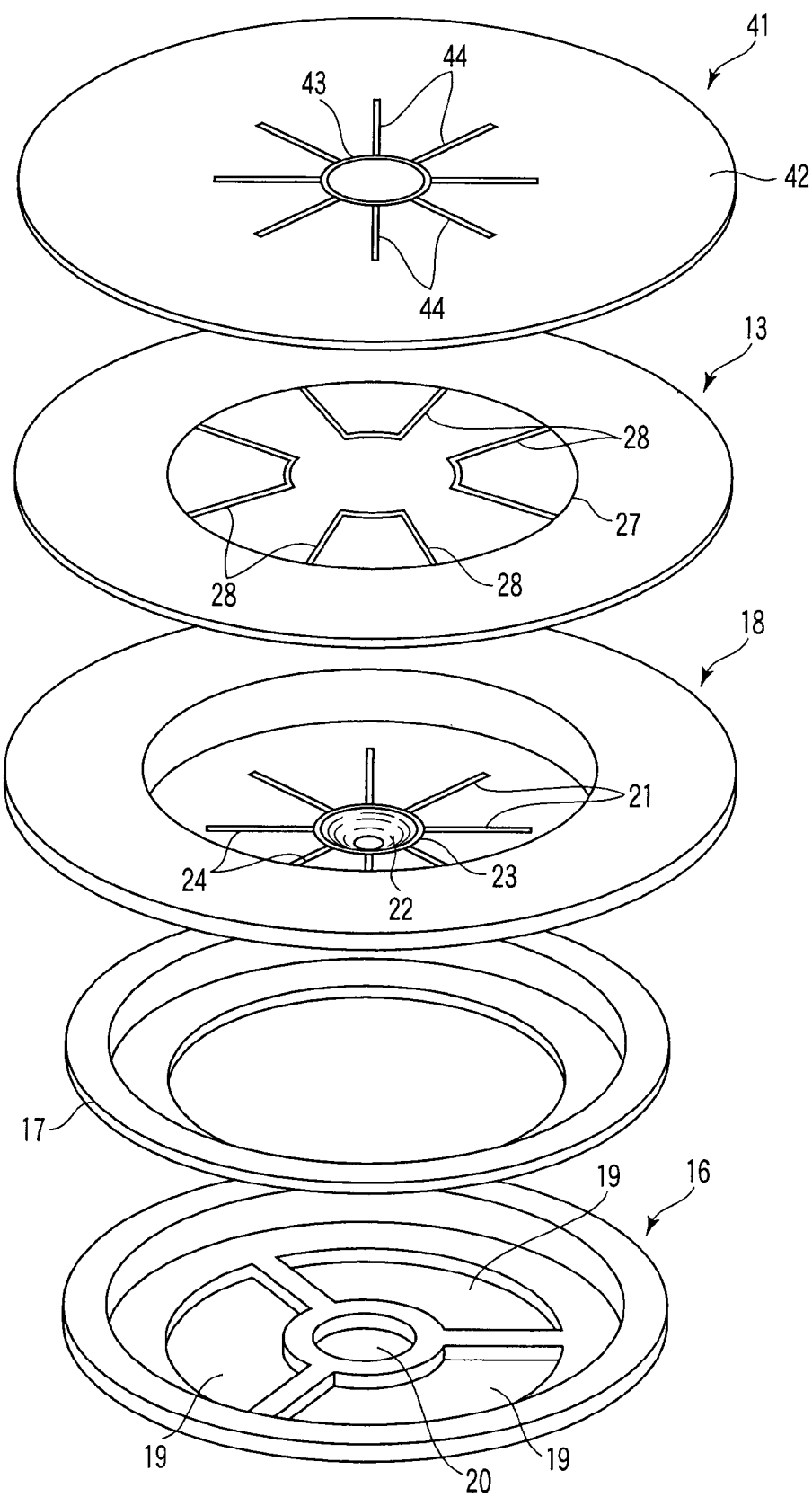
FIG. 7 is an exploded perspective view showing another mode of essential parts of the sealing lid group assembled in the cylindrical nonaqueous electrolyte secondary battery.

As shown in FIG. 7, the conductive support plate 41 is disposed so as to cover the entire surface (upper surface) of the PTC element 13 at the terminal plate side. The conductive support plate 41 is composed of: a conductive disk 42 which is crimped and fixed in the insulating gasket 10; a notch, for example, a circular notch 43 which is formed in the conductive disk 42 and easily broken by elevation of the internal pressure due to gas generation; and eight linear notches 44 which extend radially to outside from the notch 43.

When, in the conductive support plate 41 having the configuration as shown in FIG. 7, the internal pressure of the external can is raised due to gas generation, the rupture plate 18 is broken, and further the PTC element 13 is broken and gas pressure is applied, it is broken from the notches 43, 44, and gas is released.

Figure 8:
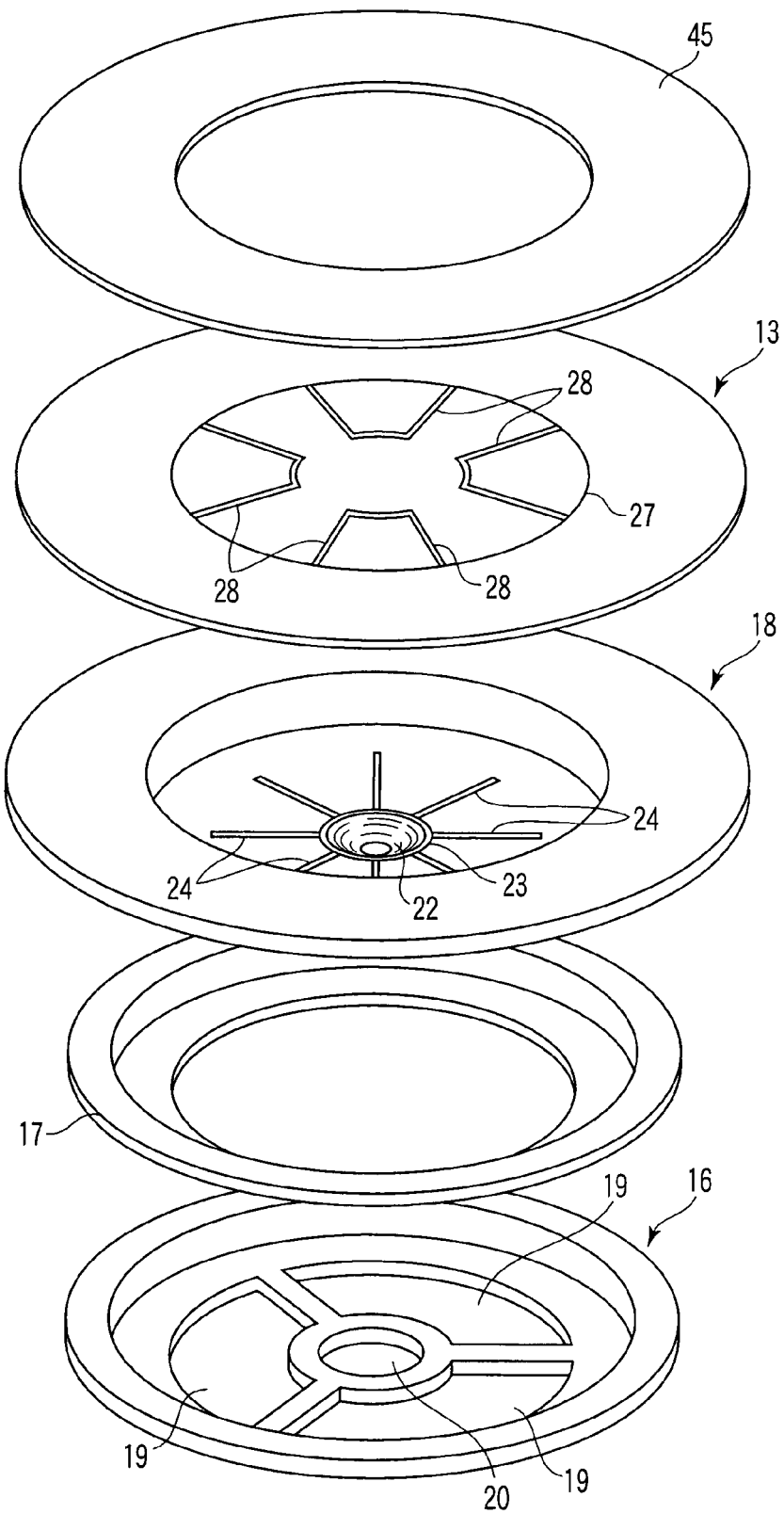
FIG. 8 is an exploded perspective view showing another mode of essential parts of the sealing lid group assembled in the cylindrical nonaqueous electrolyte secondary battery.

As shown in FIG. 8, a conductive ring plate 45 serving as a conductive support plate is fixed and crimped in the insulating gasket 10 so as to cover the entire surface (upper surface) of the PTC element 13 at the terminal plate side.

Figure 9:
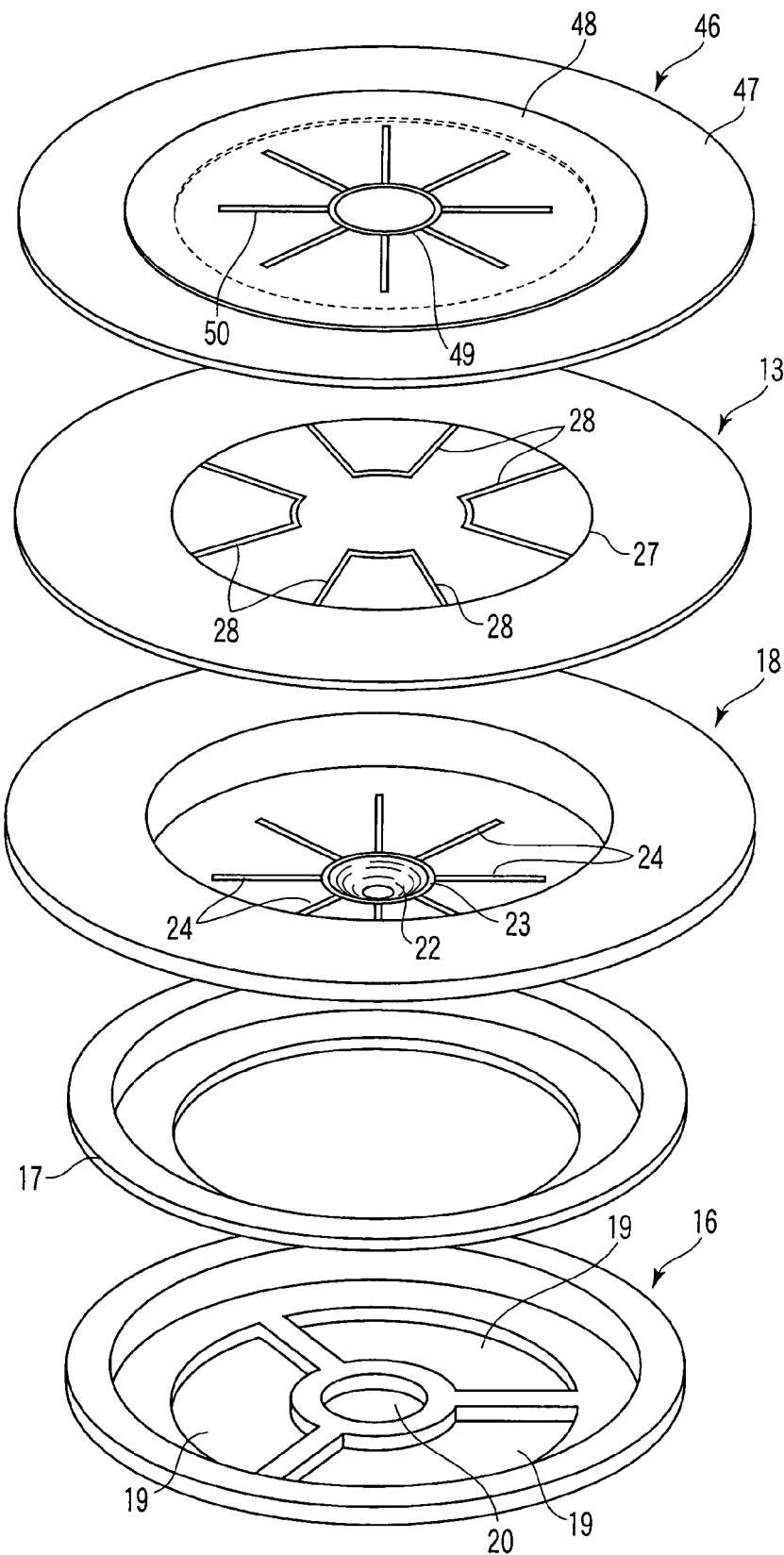
FIG. 9 is an exploded perspective view showing another mode of essential parts of the sealing lid group assembled in the cylindrical nonaqueous electrolyte secondary battery.

As shown in FIG. 9, a conductive support plate 46 is disposed so as to cover the entire surface (upper surface) of the PTC element 13 at the terminal plate side. The conductive support plate 46 is composed of: a conductive ring plate 47 which is crimped and fixed in the insulating gasket 10; a circular thin plate 48 fixed to cover the hollow space at least at one side (for example, upper surface) of the ring plate 47 excluding the fixed portion by the insulating gasket 10; a notch, for example, a circular notch 49 formed in the thin plate 48, the notch being a fragile portion to be easily broken by elevation of the internal pressure due to gas generation; and eight linear notches 50 which extend radially to outside from the notch 49. The circular thin plate is made of, for example, aluminum or nickel, and formed in a thickness of 0.05 to 0.3 mm so as to be broken easily by elevation of the internal pressure due to gas generation.

When, in the conductive support plate 46 having the configuration shown in FIG. 9, the internal pressure in the external can is raised by gas generation, the rupture plate 18 is broken, and further the PTC element 13 is broken and gas pressure is applied, it is broken from the notches 49, 50 formed in the thin plate 48, and gas is released.

Figure 10:
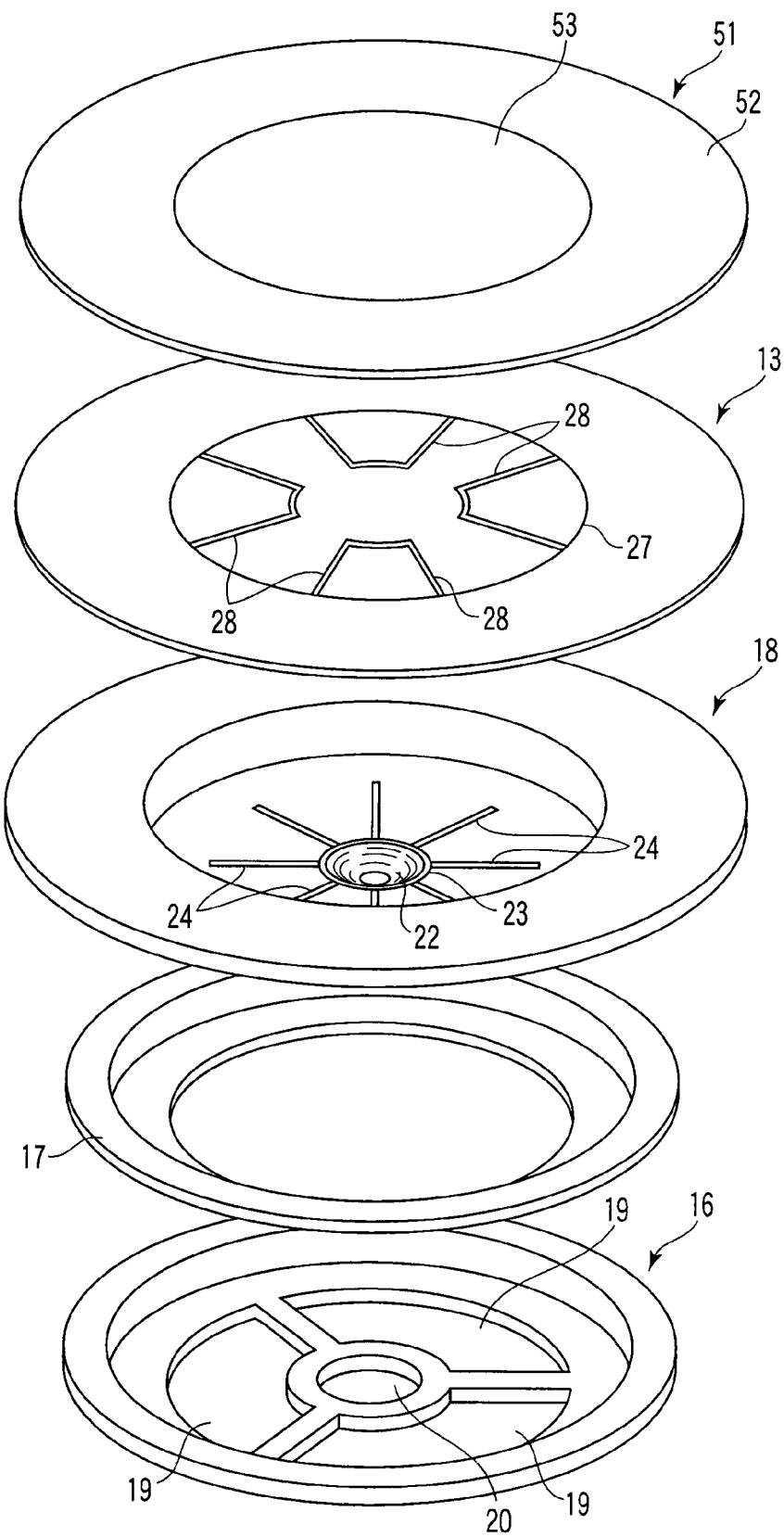
FIG. 10 is an exploded perspective view showing another mode of essential parts of the sealing lid group assembled in the cylindrical nonaqueous electrolyte secondary battery.

As shown in FIG. 10, a conductive support plate 51 is disposed so as to cover the entire surface (upper surface) of the PTC element 13 at the terminal plate side. The conductive support plate 51 is composed of: a conductive ring plate 52 which is crimped and fixed in the insulating gasket 10; and a circular high molecular resin layer 53 disposed in tight contact with the inside of a hollow space of the ring plate 52. The circular high molecular resin layer 53 is preferred to be fused at about 150 to 200° C., and is preferably made of, for example, polyvinylidene fluoride or polypropylene.

When, in the conductive support plate 50 shown in FIG. 10, the internal pressure in the external can is raised by gas generation, the rupture plate 18 is broken, and further the PTC element 13 is broken and gas pressure is applied at a relatively high temperature, the circular high molecular resin layer 53 is fused to form a gas passage, and gas is released through the gas passage.

The conductive disk 42 and conductive ring plates 45, 47, 52 composing the conductive support plates 41, 46, 51 shown in FIGS. 7 to 10 are used for crimping and fixing the PTC element 13 and rupture plate 18 stably with respect to the insulating gasket 10. Accordingly, if the conductive disk and conductive ring plate are too thin, the expected function may not be exhibited sufficiently. Conversely, if the conductive disk and conductive ring plate are too thick, the thickness of the sealing lid group is increased, so that the accommodation capacity of the electrode group is substantially lowered. Therefore, the conductive disk and conductive ring plate are desired to have a thickness of 0.1 to 0.5 mm, or more preferably 0.2 to 0.35 mm.

The conductive disk and conductive ring plate composing the conductive support plate are preferred to be manufactured from a conductive material of relatively large Young's modulus (Young's modulus at 25° C. of $1\times10^{11}$ to $3.27\times10^{11}$ Pa) in order to exhibit the function effectively. For example, they can be manufactured from iron, nickel, copper, cobalt, chromium, or their alloys, or molybdenum and tantalum.

According to the configuration shown in FIGS. 7 to 10, the crimping fixing strength of the rupture plate 18 and PTC element 13 in the peripheral edge thereof with respect to the insulating gasket 10 is improved by the conductive support plate, and therefore, it is possible to prevent deformation of the peripheral edge of these members due to elevation of the internal pressure of the external can caused by gas generation. As a result, fluctuations of working pressure at the time of breakage of the rupture plate 18 and the PTC element 13 can be suppressed, so that a stable rupture function is assured.

In particular, the conductive support plate 41 having the notches 43, 44 shown in FIG. 7, the conductive support plate 46 having the circular thin plate 48 having formed therein the notches 49, 50 shown in FIG. 9, and the conductive support plate 51 having the circular high molecular resin layer 53 shown in FIG. 10 have the rupture function as mentioned individually. Accordingly, together with the rupture plate 18 and intact PTC element 13, triple rupture function members may be provided, and even in the event of impact such as drop, invasion of water from outside or leakage of the nonaqueous electrolytic solution can be prevented more securely.

The conductive support plates shown in FIGS. 7 to 10 are disposed on the surface of the PTC element 13 at the terminal plate side, but not limited thereto and may be also disposed between the PTC element 13 and the rupture plate 18.

Second Embodiment

Figure 11:
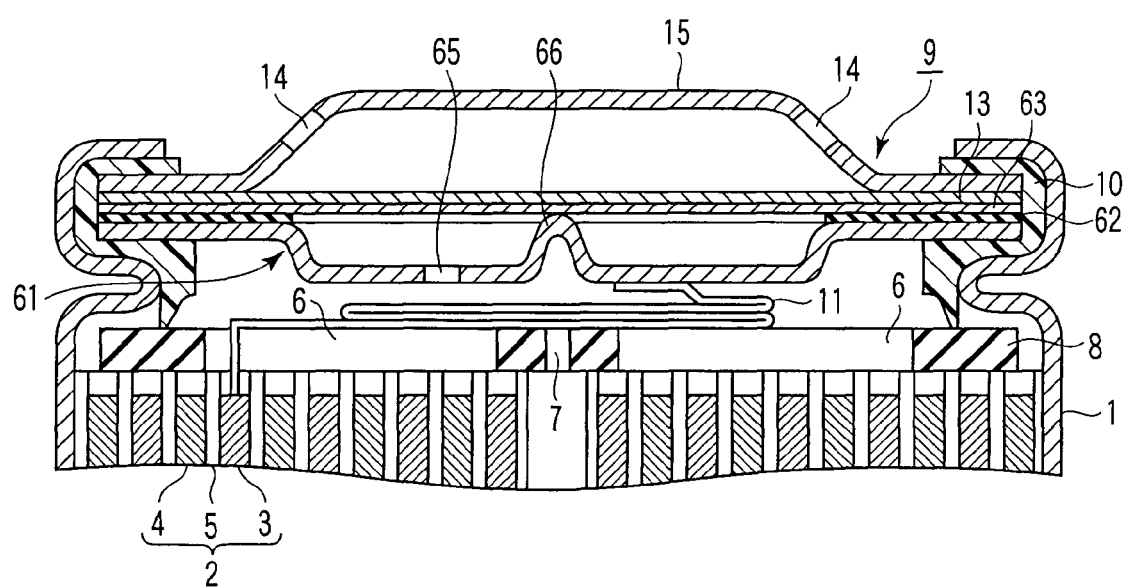
FIG. 11 is a partial sectional view showing a cylindrical nonaqueous electrolyte secondary battery according to a second embodiment of the invention.

FIG. 11 is a partial sectional view showing a cylindrical nonaqueous electrolyte secondary battery according to a second embodiment of the invention, and FIG. 12 is an exploded perspective view showing essential parts of a sealing lid group assembled in the cylindrical nonaqueous electrolyte secondary battery in FIG. 11. In FIGS. 11 and 12, the same members as in FIGS. 1 and 2 are identified with same reference numerals, and explanation thereof is omitted.

In FIGS. 11 and 12, the sealing lid group 9 is composed of a conductive current breaking member 61, an insulating ring 62, a rupture plate 63, and a hat-shaped terminal plate 15 having a PTC element 13 and gas vents 14 and serving as the other polarity terminal (for example, positive electrode terminal), which are crimped and fixed in this order by the insulating gasket 10 at their peripheral edges.

The current breaking member 61 is formed like a dish as shown in FIG. 12, and a peripheral edge of the current breaking member has a stripper 64 crimped and fixed by the insulating gasket 10. The stripper 64 has, for example, three holes 65 as gas passages at a position corresponding to the hollow space in the insulating ring 62. The stripper 64 has a protrusion 66 projecting toward the rupture plate 63 near the center, and the leading end of the protrusion 66 is connected to the rupture plate 63 through the hollow space in the insulating ring 62. The stripper 64 is made of stainless steel or aluminum, and has a thickness of 0.1 to 0.3 mm. For example, a folding type lead wire 11 made of a metal such as aluminum is connected to one electrode (for example, positive electrode 3) of the electrode assembly 2 at one end thereof, and connected to the bottom of the stripper 64 at the other end thereof.

The insulating ring 62 has a thickness of, for example, 0.05 to 0.5 mm.

The rupture plate 63 is in a plate as shown in FIG. 12, and a peripheral edge of the rupture plate 63 is crimped and fixed by the insulating gasket 10. In the rupture plate 63, a notch, for example, a circular notch 67 is formed at the surface of the PTC element 13 side, and, for example, eight linear notches 68 extending radially to the peripheral edge from the circular notch 67 are formed. The rupture plate 63 is made of stainless steel or aluminum, and has a thickness of 0.1 to 0.2 mm.

The PTC element 13 has the same structure as that explained in the first embodiment.

In the nonaqueous electrolyte secondary battery in the second embodiment shown in FIGS. 11 and 12, since the operation in the normal mode and abnormal mode (external short-circuiting) is same as that in the first embodiment, only the operation in the abnormal mode (overcharging) will be described below.

3) Overcharging Mode

When, due to overcharging, temperature in the external can 1 elevates, gas is generated due to reaction between the electrode assembly 2 and the nonaqueous electrolytic solution and due to decomposition of the nonaqueous electrolytic solution, and the internal pressure climbs up, the gas passes through the holes 6, 7 in the insulating presser plate 8, the three holes 65 opened in the stripper 61, and the hollow space in the insulating ring 62 to reach the rupture plate 63, and pushes up the rupture plate 63 to the terminal plate 15 side. When the rupture plate 63 is pushed up, the stripper 61 having the protrusion 66 contacting with the bottom of the rupture plate 63 is not deformed, and therefore, the protrusion 66 is departed from the rupture plate 63, and the conduction path of the positive electrode is electrically cut off. As a result, further heat generation and elevation of the internal pressure due to continuous current can be avoided.

If the internal pressure further climbs up after cutting off the current transmission path of the positive electrode, a higher gas pressure is applied to the rupture plate 63 through the gas passage. At this time, since the notches 67, 68 are formed in the rupture plate 63 as shown in FIG. 12, the rupture plate 63 is broken from the notches 67, 68 due to the applied pressure of gas. As the rupture plate 63 is broken, the gas further flows into the circular PTC element 13. Then, since the PTC element 13 has notches 27, 28 as shown in FIG. 12, the PTC element 13 is broken from these notches 27, 28, and thus, the gas is smoothly released outside through the gas vent 14 of the terminal plate 15 from the broken position of the PTC element 13. As a result, destruction of the battery due to excessive elevation of the internal pressure can be prevented.

In the event of impact such as a heavy drop, in addition to the rupture plate 63, the PTC element 13 is provided which has a rupture function and has the notches 27, 28 formed therein. Thus, even if one rupture function member (for example, rupture plate 63) is broken, the PTC element 13 having the rupture function maintains a normal state without being broken. Even if water invades from outside through the gas vent 14 of the terminal plate 15, it can be cut off by the normal PTC element 13, and invasion of water into the nonaqueous electrolyte (for example, nonaqueous electrolytic solution) in the external can 1 can be blocked. In addition, discharge of the nonaqueous electrolytic solution in the external can 1 can be blocked by the normal PTC element 13, and leakage of the nonaqueous electrolytic solution can be prevented.

Therefore, according to the second embodiment, the resistance of the PTC element which is a constituent member of the battery is lowered in the normal state, and discharge of high output is realized. On the other hand, in the event of an abnormality such as external short-circuiting or overcharging, heat generation (temperature rise) and elevation of the internal pressure can be prevented. Further, even if gas generation or elevation of the internal pressure is caused by temperature rise, the PTC element itself is broken, a gas passage is formed to release gas promptly, and breakage can be prevented. Moreover, double rupture function members of the rupture plate and intact PTC element are provided, whereby in the event of impact such as a fall, invasion of water from outside or leak of the nonaqueous electrolytic solution can be prevented. As a result, it is possible to provide a nonaqueous electrolyte secondary battery having a high output characteristic, high safety, and high reliability.

Third Embodiment

Figure 13:
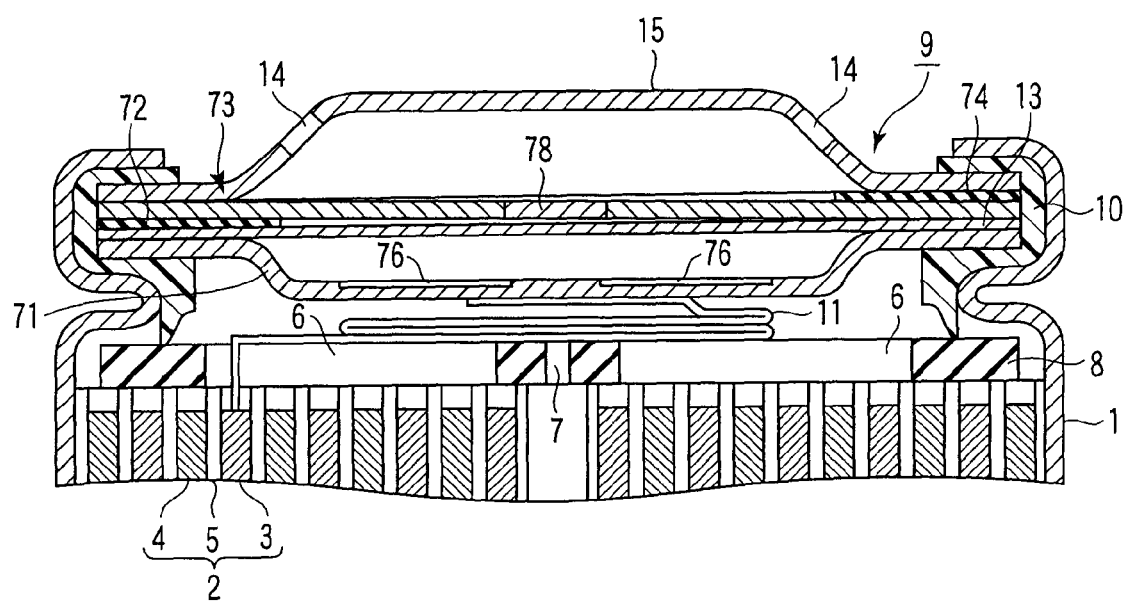
FIG. 13 is a partial sectional view showing a cylindrical nonaqueous electrolyte secondary battery according to a third embodiment of the invention.

FIG. 13 is a partial sectional view showing a cylindrical nonaqueous electrolyte secondary battery according to a third embodiment of the invention, and FIG. 14 is an exploded perspective view showing essential parts of a sealing lid group assembled in the cylindrical nonaqueous electrolyte secondary battery in FIG. 13. In FIGS. 13 and 14, the same members as in FIGS. 1 and 2 are identified with same reference numerals, and explanation thereof is omitted.

In FIGS. 13 and 14, the sealing lid group 9 is composed of a rupture plate 71, a PTC element 13, a first half insulating ring 72, a current breaking member 73, a second half insulating ring 74, and a hat-shaped terminal plate 15 having gas vents 14 opened and serving as the other polarity terminal (for example, positive electrode terminal), which are crimped and fixed in this order from the electrode assembly 2 side by the insulating gasket 10 at their peripheral edges.

The rupture plate 71 is formed like a dish as shown in FIG. 14, and a peripheral edge of the rupture plate 71 is crimped and fixed by the insulating gasket 10. In the rupture plate 71, a notch, for example, a circular notch 75 is formed in the recess at the surface of the PTC element 13 side, and, for example, eight linear notches 76 extending radially to the peripheral edge from the circular notch 75 are formed. A folding type lead wire 11 made of, for example, a metal such as aluminum is connected to one electrode (for example positive electrode 3) of the electrode assembly 3 at one end thereof, and connected to the bottom of the rupture plate 71 at the other end thereof. The rupture plate 71 is made of, for example, stainless steel or aluminum, and has a thickness of 0.1 to 0.3 mm.

The PTC element 13 has the same structure as that explained in the first embodiment.

The current breaking member 73 comprises two half conductive rings 77a, 77b as shown in FIG. 14, and peripheral edges of these half conductive rings 77a, 77b are crimped and fixed by the insulating gasket 10 so as to be apart from each other across a desired gap between both ends thereof. The half conductive rings 77a, 77b are made of, for example, stainless steel or aluminum, and have a thickness of 0.1 to 0.3 mm. A temperature fuse 78 is disposed near the center of the half conductive rings 77a, 77b, and connected to the half conductive rings 77a, 77b by way of lead terminals 79a, 79b. The temperature fuse 78 has a structure in which, for example, a low melting point metal strip which is a fusible member is sealed in a flat tube closed at both ends made of a plastic material, and both ends of the low melting point metal strip are connected to the lead terminals 79a, 79b through a terminal wire made of high melting point metal.

Peripheral edges of the first and second half insulating rings 72, 74 are crimped and fixed by the insulating gasket 10 so as to be symmetrical across the half conductive rings 77a, 77b. That is, the first half insulating ring 72 is disposed so as to contact with the lower surface of the half conductive ring 77a, and the second half insulating ring 74 is disposed so as to contact with the upper surface of the half conductive ring 77b.

In the operation of the PTC element 13 and temperature fuse 78, the PCT element 13 is designed and selected to be actuated at a lower current than the melting current of the temperature fuse 78 in order than the PTC element 13 operates by priority.

In the nonaqueous electrolyte secondary battery according to the third embodiment shown in FIGS. 13 and 14, since the operation in the normal mode and abnormal mode (external short-circuiting) is same as that in the first embodiment, only the operation in the abnormal mode (overcharging) is described below.

Overcharging Mode

When, due to overcharging, temperature elevates by abnormal voltage and heat generation, the temperature fuse 78 connected in series to the PTC element 13 by way of the half conductive ring 77b and lead terminal 79b is melted down, and the conduction path of the positive electrode is electrically cut off. As a result, further heat generation and elevation of the internal pressure due to continuous current can be avoided.

If the internal pressure further climbs up after cutting off the current transmission path of the positive electrode due to heat generation and gas generation, a higher gas pressure is applied to the rupture plate 71. At this time, since the notches 75, 76 are formed in the rupture plate 71 as shown in FIG. 14, the rupture plate 71 is broken from the notches 75, 76 due to the applied pressure of gas. As the rupture plate 71 is broken, the gas further flows into the circular PTC element 13. Then, since the notches 27, 28 as shown in FIG. 14, for example, are formed in the PTC element 13, the PTC element 13 is broken from these notches 27, 28, and thus, the gas is smoothly released outside through the hollow space of the half conductive rings 77a, 77b and the gas vent 14 of the terminal plate 15 from the broken position of the PTC element 13. As a result, destruction of the battery due to excessive elevation of the internal pressure can be prevented.

In the event of impact such as a heavy drop, in addition to the rupture plate 71, the PTC element 13 is provided which has a rupture function and has the notches 27, 28 formed therein. Thus, even if one rupture function member (for example, rupture plate 71) is broken, the PTC element 13 having the rupture function maintains a normal state without being broken. Accordingly, even if water invades from outside through the gas vent 14 of the terminal plate 15 and the hollow space in the half conductive rings 77a, 77b, it can be cut off by the normal PTC element 13, and invasion of water into the nonaqueous electrolyte (for example, nonaqueous electrolytic solution) in the external can 1 can be blocked. In addition, discharge of the nonaqueous electrolytic solution in the external can 1 can be blocked by the normal PTC element 13, and leakage of the nonaqueous electrolytic solution can be prevented.

Therefore, according to the third embodiment, the resistance of the PTC element which is a constituent member of the battery is lowered in the normal state, and discharge of high output is realized. On the other hand, in the event of an abnormality such as external short-circuiting or overcharging, heat generation (temperature rise) and elevation of the internal pressure can be prevented. Further, even if gas generation or elevation of the internal pressure is caused by temperature rise, the PTC element itself is broken, a gas passage is formed to release gas promptly, and breakage can be prevented. Moreover, double rupture function members of the rupture plate and intact PTC element are provided, whereby in the event of impact such as fall, invasion of water from outside or leakage of the nonaqueous electrolytic solution can be prevented. As a result, it is possible to provide a nonaqueous electrolyte secondary battery having a high output characteristic, high safety, and high reliability.

The sealing lid group in the cylindrical nonaqueous electrolyte secondary battery according to the second and third embodiments may further include a conductive support plate explained in FIGS. 7 to 10.

The current breaking member is not limited to the configuration explained in the first to third embodiments and may be any means or structure as far as the current can be cut off as required due to increase of pressure in the battery. For example, a folding type lead wire may be realized by a member for conducting and cutting off the current to be deformed to approach or depart by compression due to increase of pressure in the battery, and a member to be broken at the time of elevation of the internal pressure may be used as a valve membrane.

Examples of the invention will be specifically described below by referring to FIGS. 1 and 2.

Example 1

Fabrication of Positive Electrode

A slurry was prepared by dissolving 91 wt. % of powder of lithium cobalt oxide ($Li_xCoO_2$; X being in a range of $0<x\leq1$), 3 wt. % of acetylene black, 3 wt. % of graphite, and 3 wt. % of polyvinylidene fluoride (PVdF) as a binder in N-methyl-2-pyrrolidone (NMP) as a solvent. The slurry was applied on both sides of a current collector composed of an aluminum foil of 15 μm in thickness excluding one end at the lateral direction side, dried and pressed to thereby fabricate a positive electrode of 3.2 g/cm³ in density.

<Fabrication of Negative Electrode>

A carbonaceous matter was prepared as powder of mesophase pitch carbon fiber heated at 3000° C. {the fiber diameter was 8 μm, the average fiber length was 20 μm, the aspect ratio was 0.4, the plane interval ($d_{002}$) of (002) plane determined by powder X-ray diffraction was 0.3360 nm, and the specific surface area by a BET method was 1 m$_2$/g}. A slurry was prepared by dissolving 93 wt. % of the carbonaceous matter and 7 wt. % of polyvinylidene fluoride (PVdF) as a binder in N-methyl-2-pyrrolidone (NMP) as a solvent. The slurry was applied on both sides of a current collector composed of a copper foil of 12 μm in thickness, dried and pressed to thereby fabricate a negative electrode of 1.35 g/cm$^3$ in filling density.

<Separator>

A separator was prepared by using a polyethylene porous film having thickness of 25 μm, heat shrinkage of 20% in 1 hour at 120° C., and porosity of 50%.

<Preparation of Nonaqueous Electrolytic Solution>

In a mixed solvent of ethylene carbonate (EC) and methyl ethyl carbonate (MEC) (mixed volume ratio 1:2), lithium phosphate hexafluoride (LiPF$_6$) was dissolved to concentration of 1 mole/L, and a nonaqueous electrolytic solution was prepared.

<Fabrication of Electrode Assembly>

A strip-shaped positive electrode tab was welded to an exposed region of the current collector at one end (winding start end) of the positive electrode in the lateral direction. A strip-shaped negative electrode lead was welded to the current collector of the negative electrode. Subsequently, the positive electrode and negative electrode were wound spirally together with the separator interposed therebetween, and the electrode assembly was fabricated.

<Assembling of Battery>

The electrode assembly was put in a cylindrical external can with a bottom made of iron, the external can serving also as a negative electrode terminal, and an insulating presser plate having two semicircular holes and a tiny hole in the center was disposed on the electrode assembly. The nonaqueous electrolytic solution was poured into the external can containing the electrode assembly through the holes of the insulating presser plate. Subsequently, a current breaking member having an open valve which conducts and cuts off current and which is broken by elevation of the internal pressure by gas generation, a PTC element, and a hat-shaped terminal plate serving as a positive electrode terminal, the terminal plate having a gas vent, were laminated in this sequence, and a sealing lid group was prepared. The current breaking member comprises a stripper to which a conductive thin film is bonded as shown in FIGS. 1 to 3, and a rupture plate overlaid on the stripper by way of an insulating sheet. The PTC element is 16 mm in diameter, and has a notch of 3 mm in diameter, 100 μm in width and 5 μm in depth formed in the electrode of 25 μm in thickness at the terminal plate side.

A folding type lead welded to the positive electrode of the electrode assembly was connected to the conductive thin film of the sealing lid group, the sealing lid group was disposed on the upper end opening of the external can, the members of the current breaking member, the PTC element, and the peripheral edge of the terminal plate were crimped and fixed by way of the insulating gasket, and the electrode assembly and nonaqueous electrolytic solution were sealed tightly, so that a cylindrical lithium ion secondary battery of 18 mm in outside diameter, 65 mm in height, and 2100 mAh in battery capacity as shown in FIGS. 1 and 2 was assembled. Then, by constant voltage charging at 4.2V for 12 hours at 0.2 C as an initial charging process, a cylindrical lithium ion secondary battery was manufactured.

Examples 2 to 9

Eight types of cylindrical lithium ion secondary batteries were manufactured in the same manner as in Example 1, except the PCT element having the shape, depth, width, and opening area of the notch shown in Table 1 was used.

Comparative Examples 1, 2

Two types of cylindrical lithium ion secondary batteries were manufactured in the same manner as in example 1, except that the PCT element having the shape, depth, width, and opening area of the notch shown in Table 1 was used.

The obtained secondary batteries in Examples 1 to 9 and Comparative examples 1 and 2 were charged at a charging current of 2100 mAh up to 4.2V in 3 hours, and discharged to 3V at 2100 mA, and the battery capacity (1C capacity) was measured. Then, after charging at a charging current of 2100 mAh up to 4.2V in 3 hours, and discharging to 3V at 8400 mA, the battery capacity was measured, and the capacity ratio to 1C capacity (capacity retaining rate) was calculated.

Further, five cells of each secondary battery were prepared, the secondary batteries were evaluated by oven test in a thermostatic oven, by charging at charging current of 2100 mAh up to 4.2V in 3 hours, and heating to 200° C. at a heating speed of 10° C. To evaluate in the oven test, the duration from the time of the thermostatic oven reaching 200° C. until ignition of the secondary battery (average time of five cells of each secondary battery) was measured, and presence or absence of popping-out of the electrode assembly per five cells of each secondary battery was observed in order to check the actuation of the rupture.

Results are shown in Table 1.

TABLE 1

| | | Notch of PTC element | | | | Oven test | |
|---|---|---|---|---|---|---|---|
| | Shape of PTC element | Shape | Position | Depth (μm) | Width (μm) | Opening area (mm2) | Capacity retaining rate (%) | Top: time to ignition Bottom: electrode assembly popping out |
| Example 1 | Disk | Diameter 3 mm, circular | One side | 5 | 100 | 7.1 | 60 | 20 min 5/5p none |
| Example 2 | Disk | Diameter 3 mm, blade | One side | 5 | 100 | 7.1 | 63 | 22 min 5/5p none |
| Example 3 | Disk | Regular triangle, side 3 mm | One side | 5 | 100 | 3.9 | 61 | 18 min 5/5p none |
| Example 4 | Disk | Square, side 3 mm | One side | 5 | 100 | 9 | 59 | 15 min 5/5p none |
| Example 5 | Disk | Right angle line | One side | 5 | 100 | 7.5 | 61 | 17 min 5/5p none |

TABLE 1-continued

| | Shape of PTC element | Notch of PTC element | | | | | Oven test | |
| | | Shape | Position | Depth (μm) | Width (μm) | Opening area (mm2) | Capacity retaining rate (%) | Top: time to ignition Bottom: electrode assembly popping out |
|---|---|---|---|---|---|---|---|---|
| Example 6 | Disk | crossing (3 mm) Diameter 3 mm, circular | Two sides | 5 | 100 | 7.1 | 60 | 20 min 5/5p none |
| Example 7 | Disk | Diameter 3 mm, circular | One side | 2 | 100 | 7.1 | 58 | 15 min 5/5p none |
| Example 8 | Disk | Diameter 3 mm, circular | One side | 5 | 30 | 7.1 | 65 | 16 min 5/5p none |
| Example 9 | Disk | Square, side 1.2 mm | One side | 5 | 100 | 1.44 | 61 | 15 min 5/5p none |
| Comparative example 1 | Ring | — | — | — | — | 63.6 | 20 | 25 min 5/5p none |
| Comparative example 2 | Disk | — | — | — | — | 0 | 63 | 5 min 5/5p present |

As clear from Table 1, the secondary batteries of Examples 1 to 9 are excellent in discharge capacity at a current more than four times that usual in the secondary battery of Comparative example 1 having the PTC element of ring shape assembled therein. Further, as compared with the secondary battery of Comparative example 2 having the disk-shaped PTC element without notch assembled therein, the secondary batteries of Examples 1 to 9 are found to be extremely high in safety, and capable of discharging the gas generated inside quickly to the outside, releasing the heat, and thereby extending the time until ignition, and also preventing the electrode assembly from popping out.

Example 10

A cylindrical lithium ion secondary battery having the same structure as that in Example 1 was manufactured except that the PTC element was 16 mm in diameter, having formed therein a circular recess of 8 mm in diameter and 0.1 mm in depth from the terminal plate side.

The obtained secondary battery of Example 10 was evaluated in capacity retaining rate, time to ignition in the oven test (average of five cells of the secondary battery), and presence or absence of popping-out of the electrode assembly per five cells of the secondary battery, in the same manner as in Examples 1 to 9. As a result, the capacity retaining rate was 62%, the time to ignition in the oven test was 20 minutes, and presence or absence of popping-out of the electrode assembly was none in 5/5p.

What is claimed is:

1. A nonaqueous electrolyte secondary battery comprising:
   an external can opened at one end thereof;
   an electrode assembly contained in the external can, and comprising a negative electrode, a separator and a positive electrode;
   a nonaqueous electrolyte contained in the external can; and
   a sealing lid group tightly sealed at the opening of the external can by way of an insulating member,
   wherein the sealing lid group comprises a PTC element having a structure in which a resin sheet containing conductive carbon is interposed between a pair of electrodes composed of a metal thin film,
   a notch is formed at least in one of the pair of electrodes in the PTC element, and
   the notch has a minimum depth of at least 4% of a thickness of the at least one of the pair of electrodes and a maximum depth that extends through the at least one of the pair of electrodes into the resin sheet a depth of not more than 20% of the thickness of the resin sheet.

2. The nonaqueous electrolyte secondary battery according to claim 1, wherein the notch is configured to be rupture upon elevation of internal pressure to a predetermined level due to gas generation within the external can sealed by the sealing lid group.

3. The nonaqueous electrolyte secondary battery according to claim 1, wherein the notch has a width of 5 μm or more.

4. The nonaqueous electrolyte secondary battery according to claim 1, wherein the notch has an opening area of 1 mm$^2$ or more.

5. The nonaqueous electrolyte secondary battery according to claim 1, wherein the sealing lid group further comprises a rupture plate whose outer periphery is fixed to the insulating member, the rupture plate having a portion to be broken by elevation of internal pressure by gas generation.

6. The nonaqueous electrolyte secondary battery according to claim 5, wherein the portion is a notch formed at least in one side of the rupture plate.

7. The nonaqueous electrolyte secondary battery according to claim 1, wherein the sealing lid group further comprises a current breaking member.

8. The nonaqueous electrolyte secondary battery according to claim 1, wherein the sealing lid group further comprises a conductive support plate positioned at one side of the PTC element and fixed in the insulating member at a peripheral edge thereof.

9. The nonaqueous electrolyte secondary battery according to claim 8, wherein the support plate has an intact portion to be broken by elevation of internal pressure by gas generation.

10. The nonaqueous electrolyte secondary battery according to claim 8, wherein the support plate is a ring.

11. The nonaqueous electrolyte secondary battery according to claim 8, wherein the support plate is composed of a ring plate to be fixed by the insulating member, a thin plate fixed to cover a hollow space at least at one side of the ring plate excluding the fixed portion by the insulating member, and a portion to be broken by elevation of internal pressure by gas generation, the portion being formed in the thin plate.

12. The nonaqueous electrolyte secondary battery according to claim 8, wherein the support plate is composed of a ring plate, and a circular polymeric resin layer disposed in tight contact with the inner side of a hollow space of the ring plate.

* * * * *